United States Patent [19]

Nicolas

[11] Patent Number: 4,859,053

[45] Date of Patent: Aug. 22, 1989

[54] PROJECTING APPARATUS WITH SPHERICAL SCREEN, MORE PARTICULARLY FOR ADVERTISING PURPOSES

[76] Inventor: Pierre Nicolas, 38 rue Chef de Ville, 92140 Clamart, France

[21] Appl. No.: 919,440

[22] Filed: Oct. 16, 1986

[30] Foreign Application Priority Data

Oct. 10, 1985 [FR] France .............................. 85 15032

[51] Int. Cl.[4] .............................................. G03B 21/10

[52] U.S. Cl. ....................................... 353/74; 353/84; 353/88; 353/79

[58] Field of Search ...................... 353/74, 75, 88-93, 353/84, 85, 79, 122; 350/266, 273; 362/319, 321

[56] References Cited

U.S. PATENT DOCUMENTS

| | | | |
|---|---|---|---|
| 2,292,172 | 8/1942 | Stokes | 353/90 |
| 2,461,756 | 2/1949 | Moore | 353/88 |
| 2,592,444 | 4/1952 | Matelena | 353/74 |
| 3,205,766 | 9/1965 | Ewald et al. | 353/85 |
| 3,586,432 | 6/1971 | Pentes | 353/74 |
| 4,073,576 | 2/1978 | Bastian | 350/273 |

FOREIGN PATENT DOCUMENTS 2448734 9/1980 France .

*Primary Examiner*—William A. Cuchlinski, Jr.
*Assistant Examiner*—Patrick R. Scanlon
*Attorney, Agent, or Firm*—Gifford, Groh, Sheridan, Sprinkle and Dolgorukov

[57] ABSTRACT

A screen-forming sphere is made of a front translucent half-sphere and of a rear half-sphere which is opaque except in a central region. An image projector is situated behind the screen and has a front face comprising a platen mounted in front of the optic of the image projector. The platen contains a rotary polarization filter rotated by a first motor. The filter is occultable by a rotary flap mounted on spindles rigidly connected to two rotary vertically aligned disc members which rotate in synchronism under action of a second motor.

4 Claims, 3 Drawing Sheets

PROJECTING APPARATUS WITH SPHERICAL SCREEN, MORE PARTICULARLY FOR ADVERTISING PURPOSES

FIELD OF THE INVENTION

The present invention relates to a projecting apparatus with a spherical screen, more particularly for advertizing purposes.

BACKGROUND OF THE INVENTION

Receiving screens for optical images for advertising purposes are already known, which are made of fixed or mobile surfaces placed inside cyindrical or spherical volumes (see particularly French Patent 2,116,789).

There also exist screens placed along a diametrical plane inside a sphere. These screens, which are translucent screens and of a circular shape, rotate about themselves and receive an image from a projector, which image, since the screens will rotate, starts with a determined size, develops, then shrinks and finally disappears (see French patent 2,266,249).

A rotating screen of the type just described is also known, but with a spherical volume formed of a transparent or translucent front half-sphere and a rear half-sphere which is opaque except in the central axis for permitting light rays forming the image to enter the sphere and reach the rotating screen (see French patent 2,448,734).

All these known apparatus have disadvantages since the image formed on the screen is more or less well suitably seen by the spectators. Actually, in premises which are lighted by artificial light or day light, the image is more or less visible, and moreover, when the screen rotates, the image is deformed with sometimes good results but also sometimes particularly bad results. Moreover, the rotating screen requires installation of a motor unit which is rather fragile and increases the cost of the apparatus.

OBJECTS OF THE INVENTION

The present invention remedies to these diadvantages by providing a projecting apparatus with a fixed spherical screen having a front face which is substantially of a size as a screen-forming half-sphere, and a back portion which is opaque except in a central region for permitting a projection of an image arriving from an optic means of a projector placed behind the screen. The apparatus is installed on a conveniently mounted support plate. In front of the projector there is mounted a platen supporting a rotary filter of a polarizing type and which is placed in front of the optic means of the projector. The rotary filter cooperates with a mobile flap for partially or completely obturating the optic means of the projector in order to obtain images developping on the screen either vertically or horizontally for each complete revolution of the flap and having a luminousity which varies with the rotation of the polarizing filter.

Moreover, means are provided for permitting a rotation of both the filter and the flap, said means being fed through members providing a stoppage of the image, a total disappearance of the image and also, by means of microprocessors, a variation of the rotation speed of the image polarization (filter), and this being provided in function of the slide to be projected. It is thus also possible to vary the exposition time of each slide on the spherical screen of a given projecting apparatus. It is also possible to provide a plurality of projecting apparatus of the above type, the working of which is synchronized for enabling an alternative projection of slides of several programs one after the other by creating a mutual operating synchronization of several projecting apparatus together.

SUMMARY OF THE INVENTION

According to the invention, the projecting apparatus with spherical screen comprising a front half-sphere incorporating a translucent screen and a rear half-sphere, the rear half-sphere being opaque except in a central region in order to permit a projection of images arriving from an optic means of an image projector positioned behind the screen,support means being provided for mounting the projecting apparatus, has an improvement wherein, the image projector having a front face, the front face of the image projector comprises a platen mounted in front of the optic means of the image projector, the platen carrying a rotary polarisation filter rotated by a first motor, this polarization filter being occultable by a rotary flap rotated by a second motor whereby the various points of the rotary flap will describe circles of equal radius, the rotary flap being mounted on respective spindles placed on a same vertical plane and rotating in synchronism under action of the second motor.

According to an other feature of the invention, the spindles are connected to disc means placed in a same vertical plane, with a first disc of the disc means being mounted on a shaft connected to the second motor and a second disc of the disc means being mounted on a shaft connected to the platen.

According to still another feature of the invention, switches are further provided for controlling supply in electric current of the second motor rotating the rotary flap, whereby permitting to stop the image projector in chosen positions.

According to still another feature of the invention, at least two micro-processors are further provided, with a first micro-processor for variating the rotation speed of the first motor rotating the polarization filter whereby modifying polarization in function of a considered image, and a second micro-processor for variating the rotation speed of the second motor rotating the rotary plate whereby modifying the exposition time of the considered image.

According to still another feature of the invention, a micro-processor is further provided for synchronizing a plurality of image projectors, whereby enabling an alternate projection of a plurality of image programs.

According to still another feature of the invention, an enitre projecting device is placed inside the spherical screen more specifically in the rear opaque half sphere, with the apparatus being maintained on the support means by at least one pole.

Various other features of the invention will become more apparent from the following description.

BRIEF DESCRIPTION OF THE DRAWINGS

An embodiment of the invention is shown, by way of a non limiting example, in the accompanying drawings, wherein.

DESCRIPTION OF A PREFERRED EMBODIMENT

Figure 1:
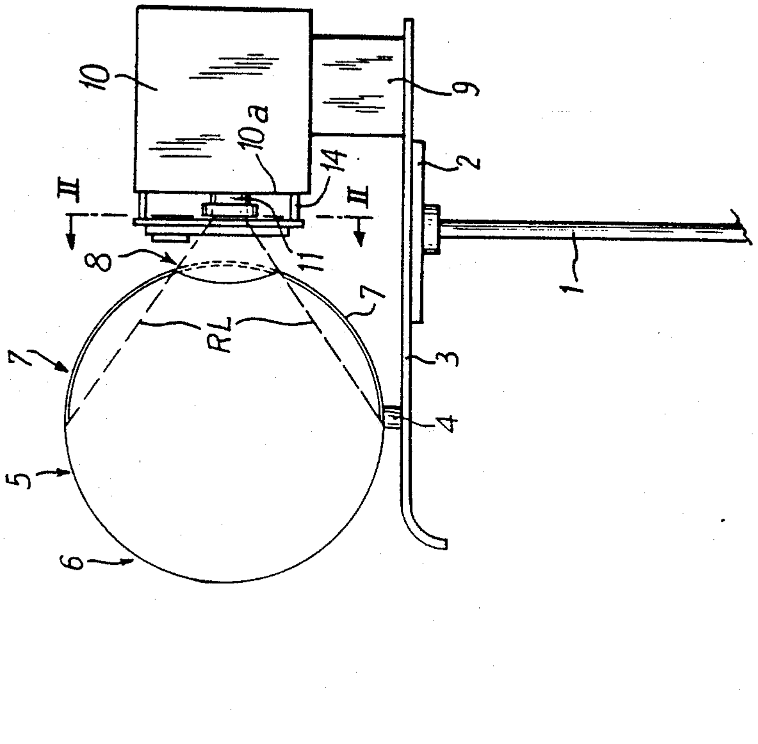
FIG. 1 is a schematic side elevation view of a projecting apparatus according to the invention.

In FIG. 1 is shown a support 1 (for example a vertical stand) having an upper portion which carries of a plate 2, maintaining a shelf 3 on the front portion of which is mounted a spindle 4 carrying a spherical screen 5. The front half-sphere portion 6 of the spherical screen 5 is translucent and the rear half-sphere portion 7 of the spherical screen 5 is opaque except for a median central region 8 which is transparent for a passage of light rays RL projecting an image on the front portion 6 of the spherical screen 5.

Figure 2:
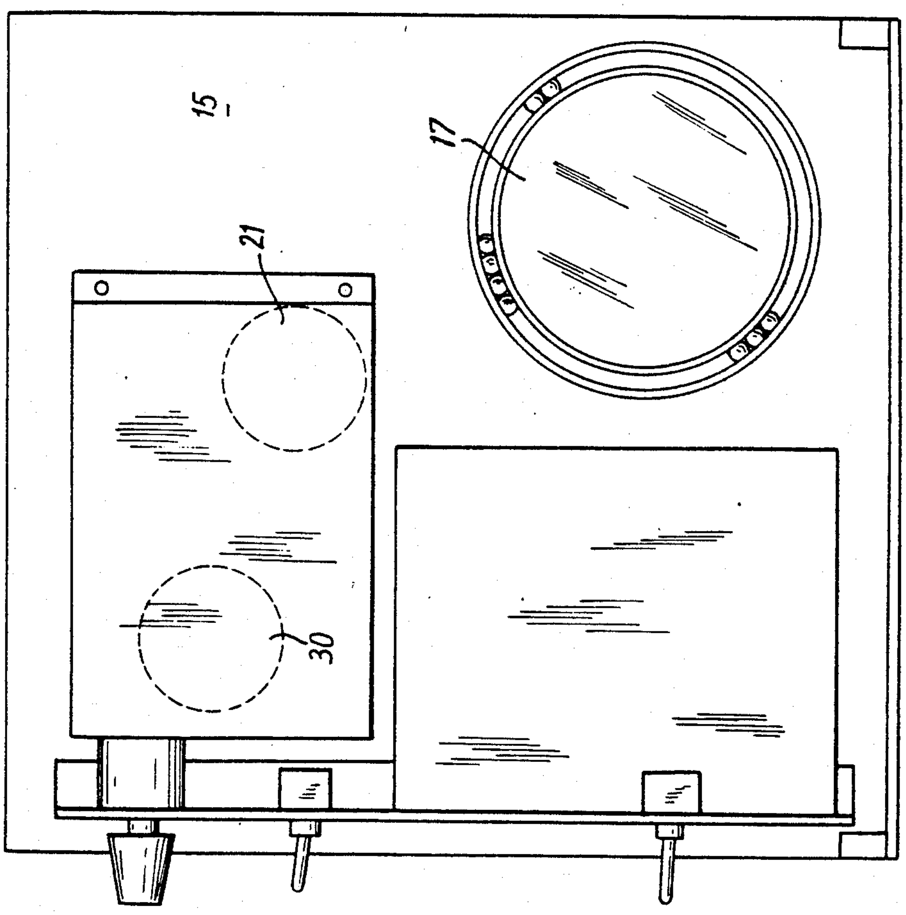
FIG. 2 is an enlarged view along line II—II of FIG. 1 of a back portion of the platen carrying the filter and of the rotary screen of the projecting apparatus of FIG. 1.

A rear part of the shelf 3 carries a support 9 on which is fixed an image projector 10 with a front face 10*a* carrying an optic means 11. Braces 14 are fixed to four angles of the front face 10a of the image projector 10 to support a rectangular platen 15 (FIGS. 2 and 3) provided with a hole 16 positioned in front of the optic means 11, and a polarization filter 17 is mounted in the hole 16.

A needle bearing 18 is interimposed between periphery of the filter 17 and edge of the hole 16 so as to permit an easy rotation of the filter 17, which rotation is obtained by means of a belt 19 driven by a motive pulley 20 of a motor 21. The belt 19 passes on a pulley 22 surrounding the filter 17 in front of the needle bearing 18. The motor 21 is fixed by any convenient means onto the rear surface of the platen 15.

Figure 4:
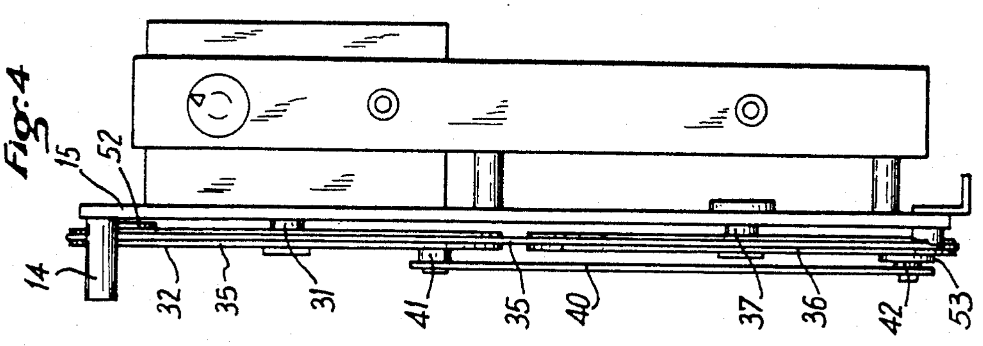
FIG. 4 is a side elevation view corresponding to FIGS. 2 and 3.
Figure 3:
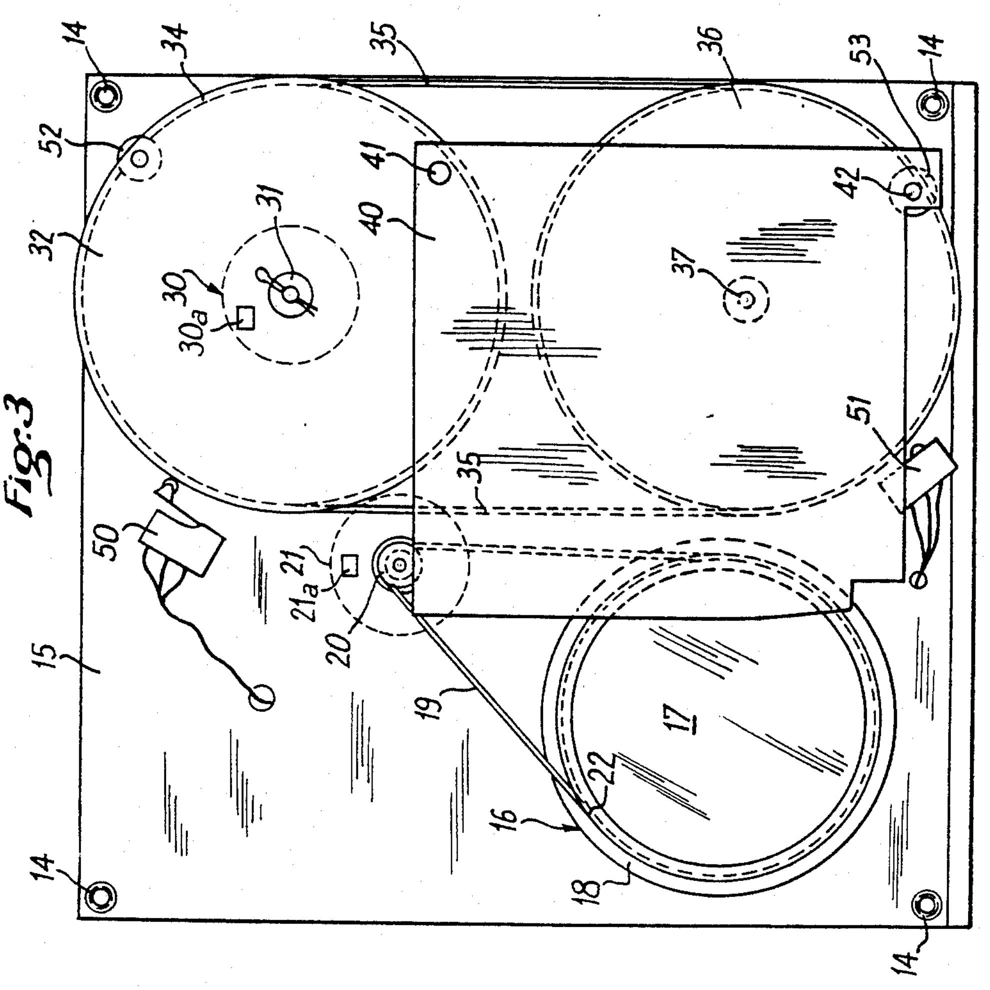
FIG. 3 is a front view of the platen carrying the filter and the rotary screen.

As it can be seen from FIGS. 3 and 4, a second motor 30 fixed on the back wall of the platen 15 drives, by means of a driving shaft 31, a disc 32 having a periphery with a groove 34 in which passes a belt 35 rotating a second disc 36 freely mounted on a spindle 37 rigidly connected to the platen 15.

The discs 32 and 36 are therefore installed on the front face of the platen 15 (see FIG. 4) and can thus rotate and rotatively drive a rotary flap 40 mounted on spindles 41, 42, with the spindle 41 rigidly connected to the upper disc 32 and the spindle 42 to the lower disc 36, the discs 32 and 36 being on a same vertical axis and in a same vertical plane.

Thus, the rotary flap 40 describes, during a complete revolution of the discs 32, 36, circles of equal radius which permits successively to let the light rays RL to pass, and then to obturate vertically and horizontally the optic means 11 of the projector 10, and therefore to prevent in a same way passage of the light rays to the filter 17. It thus results that the images projected on the spherical screen 5 are vertically and horizontally appearing and disappearing, the luminous intensity of the images being also a function of the rotation of the filter 17.

Microswitches 50, 51 cooperating with abutments 52, 53 fixed to the discs 32, 36 will provide for a temporisation time means for the image, meaning that the projection of the image stops once it has appeared vertically and horizontally. The temporisation time means is mounted on the circuit for supplying power to the motor 30 and permits also, at a certain time, to totally occult the image during a time where a slide is changed in the projector 10 by a rotation of the image magazine over a fraction of a revolution corresponding to a number of slides contained in the projector magazine.

Moreover, the power supplying circuit of the motor 21 can comprise a microprocessor (diagrammatically shown at 21*a*) to control rotation of the rotary filter 17 for setting the polarization rotation speed in function of the slide to be projected. The power supplying circuit of the motor 30, which drives the flap 40 in rotation by means of the discs 32, 36, can samely comprise another microprocessor (diagrammatically shown at 30*a*) to modify exposition time of each slide.

Figure 5:
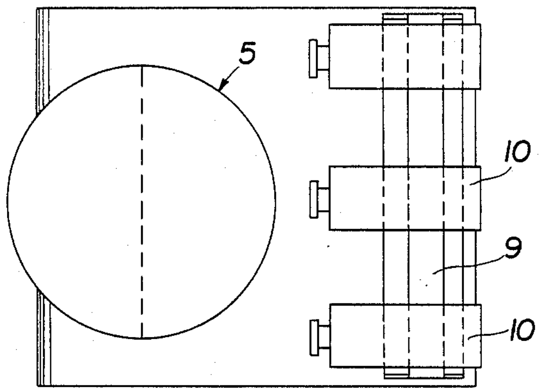
FIGS. 5 and 6 show two variants of embodiment

In a case where there is used a plurality of projecting apparatus similar to the image projector 10 of FIGS. 1–4, the microprocessor 30*a* can include in its memory several slide programs to as to permit a mutual synchronization of various projecting apparatus but in this case the various image projectors are mobile, for example on a carrier sliding with respect to the stand 9, in order to bring each image projector in an exact projection position (see FIG. 5).

Of course, the projecting apparatus of the invention is provided with standard adjustments for obtaining a perfect image on the spherical screen 5.

Figure 6:
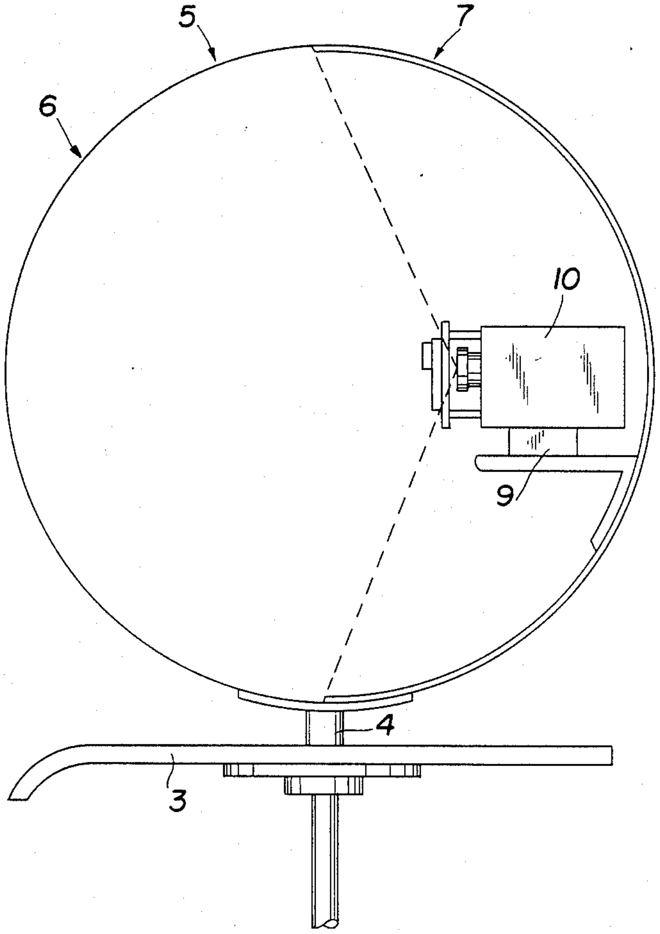

It is also possible, as shown in FIG. 6 in which the parts similar to parts of FIG. 1 have been shown by the same references, to include the entire image projector 10 and support 9 in the spherical screen 5, with the device formed by the image projector 10 and support 9 being housed inside the rear opaque half sphere 7 of the spherical sphere 5, extra members such as that shown at 4 being provided for supporting the spherical sphere 5 by its lower or upper pole or both on the shelf 3.

What is claimed is:

1. A projecting apparatus comprising a spherical screen having a front half-sphere incorporting a translucent screen and a rear half-sphere, the rear half-sphere being opaque except in a central region in order to permit a projection of images arriving from an optic means of an image projector positioned behind the screen, support means being provided for mounting the projecting apparatus, the image projector having a front face, the front face of the image projector comprising a platen mounted in front of the optic means of the image projector, the platen carrying a rotary polarization filter rotated by a first motor, said polarization filter being occultable by a rotary flap rotated by a second motor whereby the various points of the rotary flap will describe circles of equal radius, the rotary flap being mounted on respective spindles placed on a same vertical plane and rotating in synchronism under action of the second motor.

2. The projecting apparatus as set forth in claim 1, wherein said spindles are connected to respective discs placed in a same vertical plane, with a first disc of said respective discs being mounted on a shaft connected to the second motor, and a second disc of the respective discs being mounted on a shaft connected to the platen.

3. The projecting apparatus as set forth in claim 1, wherein switches are further provided for controlling supply in electric current of the second motor rotating the rotary flap, whereby permitting to stop the image projector in chosen positions.

4. The projecting apparatus as set forth in claim 1, wherein an entire projecting device is placed inside the spherical screen more specifically in the rear opaque half-sphere, with the apparatus being maintained on the support means by at least one pole.

* * * * *